(12) United States Patent
Lovin (10) Patent No.: US 11,676,371 B2
(45) Date of Patent: Jun. 13, 2023

(54) APPARATUS FOR PROCESSING A NEURAL NETWORK

(71) Applicant: FotoNation Limited, Galway (IE)

(72) Inventor: Ciprian Alexandru Lovin, Brasov (RO)

(73) Assignee: FotoNation Limited

( * ) Notice: Subject to any disclaimer, the term of this patent is extended or adjusted under 35 U.S.C. 154(b) by 63 days.

(21) Appl. No.: 16/542,138

(22) Filed: Aug. 15, 2019

(65) Prior Publication Data

US 2020/0057919 A1    Feb. 20, 2020

Related U.S. Application Data

(60) Provisional application No. 62/719,605, filed on Aug. 17, 2018.

(51) Int. Cl.
| | | |
|---|---|---|
| *G06N 3/04* | (2023.01) | |
| *G06V 10/94* | (2022.01) | |
| *G06N 3/08* | (2023.01) | |
| *G06F 18/21* | (2023.01) | |
| *G06V 10/764* | (2022.01) | |
| *G06V 10/82* | (2022.01) | |

(52) U.S. Cl.
CPC ............ *G06V 10/94* (2022.01); *G06F 18/217* (2023.01); *G06N 3/08* (2013.01); *G06V 10/764* (2022.01); *G06V 10/82* (2022.01)

(58) Field of Classification Search
CPC combination set(s) only.
See application file for complete search history.

(56) References Cited

U.S. PATENT DOCUMENTS

| | | | |
|---|---|---|---|
| 7,737,985 B2 | 6/2010 | Torzewski et al. | |
| 10,205,950 B2* | 2/2019 | Terada | H04N 19/105 |
| 10,810,491 B1* | 10/2020 | Xia | G06N 3/08 |

(Continued)

FOREIGN PATENT DOCUMENTS

| | | |
|---|---|---|
| WO | 2016/083002 A1 | 6/2016 |
| WO | 2017/129325 A1 | 12/2016 |
| WO | 2019042703 A1 | 3/2019 |

OTHER PUBLICATIONS

Ievgen Khvedchenia, "Tile-based image processing", www.computer-vision-talks.com/tile-based-image-processing/, 2015.

*Primary Examiner* — Cindy Trandai
(74) *Attorney, Agent, or Firm* — Lerner David LLP (57) ABSTRACT

An apparatus for processing a neural network comprises an image memory into which an input image is written tile-by-tile, each tile overlapping a previous tile to a limited extent; a weights memory for storing weight information for a plurality of convolutional layers of a neural network, including at least two pooling layers; and a layer processing engine configured to combine information from the image and weights memories to generate an output map and to write the output map to image memory. The apparatus is configured to store a limited number of values from adjacent a boundary of an output map for a given layer. The layer processing engine is configured to combine the output map values from a previously processed image tile with the information from the image memory and the weights when generating an output map for a layer of the neural network following the given layer.

20 Claims, 8 Drawing Sheets

(56) References Cited

U.S. PATENT DOCUMENTS

| | | | |
|---|---|---|---|
| 2005/0134588 A1* | 6/2005 | Aila | G06T 15/60 |
| | | | 345/426 |
| 2013/0107973 A1* | 5/2013 | Wang | H04N 19/82 |
| | | | 375/240.29 |
| 2016/0219298 A1* | 7/2016 | Li | H04N 19/593 |
| 2016/0364644 A1* | 12/2016 | Brothers | G06N 3/049 |
| 2018/0150721 A1* | 5/2018 | Mostafa | G06N 3/063 |
| 2018/0250744 A1* | 9/2018 | Symeonidis | B23K 26/0626 |
| 2019/0171930 A1* | 6/2019 | Lee | G06F 17/15 |
| 2019/0197083 A1* | 6/2019 | Chen | G06N 3/10 |
| 2019/0220734 A1* | 7/2019 | Ferdman | G06N 3/063 |
| 2019/0220742 A1* | 7/2019 | Kuo | G06N 3/0481 |
| 2019/0243755 A1* | 8/2019 | Luo | G06N 3/063 |
| 2020/0159809 A1* | 5/2020 | Catthoor | G06N 3/08 |
| 2020/0293813 A1* | 9/2020 | Shibata | G06T 7/00 |
| 2020/0410633 A1* | 12/2020 | Pieters | G06T 15/04 |

\* cited by examiner

APPARATUS FOR PROCESSING A NEURAL NETWORK

FIELD

The present invention relates to an apparatus for processing a neural network.

BACKGROUND

Figure 1:
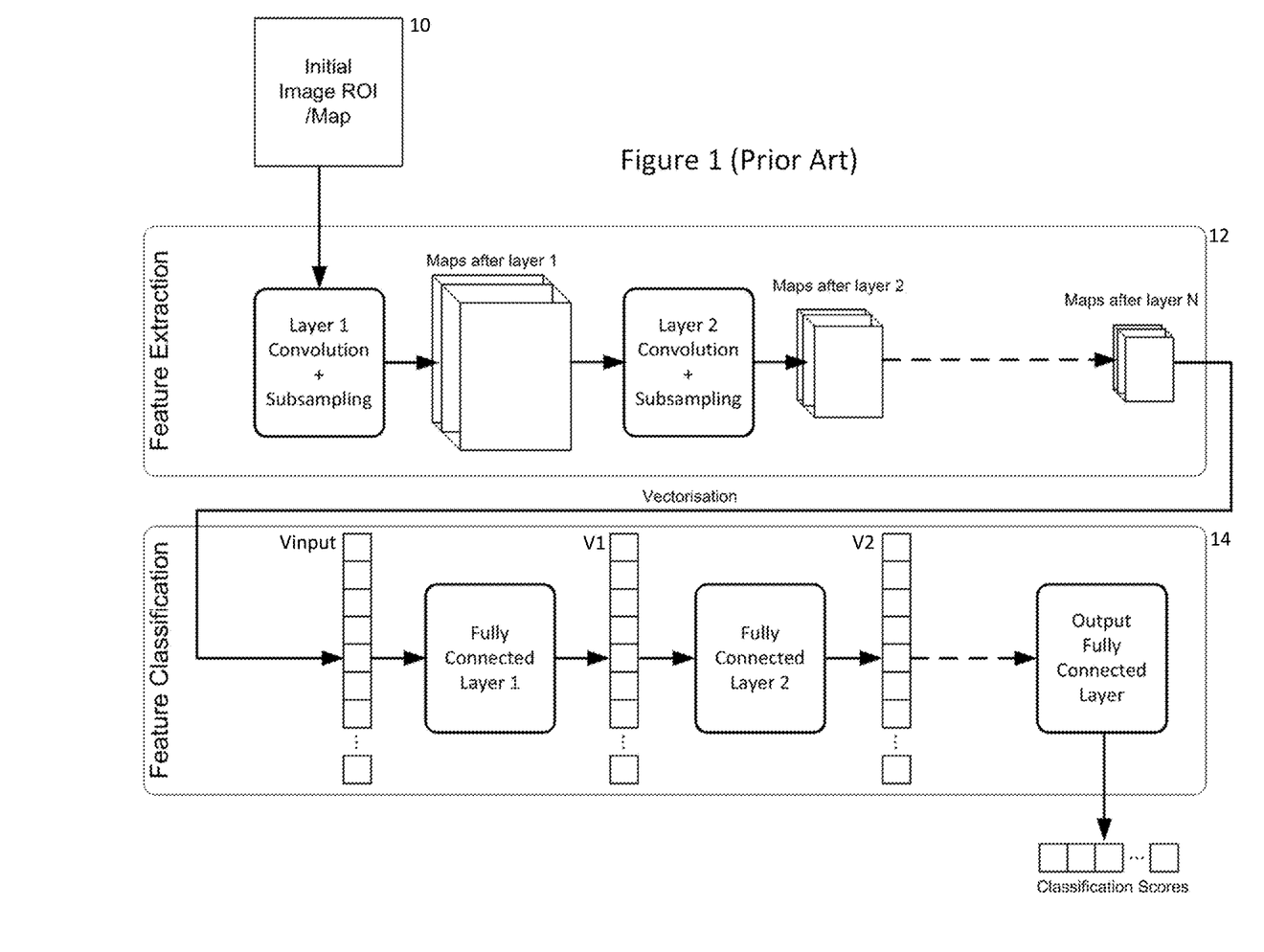
FIG. 1 illustrates a typical convolution neural network (CNN) architecture.

A processing flow for typical Convolutional Neural Network (CNN) is presented in FIG. 1. Typically, the input to the CNN is at least one 2D image/map 10 corresponding to a region of interest (ROI) from an image. The image/map(s) can comprise image intensity values only, for example, the Y plane from a YCC image; or the image/map(s) can comprise any combination of colour planes from an image; or alternatively or in addition, the image/map(s) can contain values derived from the image such as a Histogram of Gradients (HOG) map as described in PCT Application No. PCT/EP2015/073058 (Ref: FN-398), the disclosure of which is incorporated by reference, or an Integral Image map.

CNN processing comprises two stages:

Feature Extraction (12)—the convolutional part; and

Feature classification (14).

CNN feature extraction 12 typically comprises a number of processing layers 1 ... N, where:

Each layer comprises a convolution followed by optional subsampling;

Each layer produces one or (typically) more maps (sometimes referred to as channels);

The size of the maps after each convolution layer is typically reduced by subsampling (examples of which are pooling or max-pooling);

A first convolution layer typically performs 2D convolution of an original 2D image/map to produce its output maps, while subsequent convolution layers may perform 3D convolution using the output maps produced by the previous layer as inputs. Nonetheless, if the input comprises say a number of maps previously derived from an image; or multiple color planes, for example, RGB or YCC for an image; or multiple versions of an image, then the first convolution layer can operate in exactly the same way as successive layers, performing a 3D convolution on the input images/maps.

2-D or 3-D convolution kernels have A×B or A×B×C values or weights respectively, pre-calculated during a training phase of the CNN. Input map pixel values are combined with the convolution kernel values using a dot product function. After the dot product is calculated, an activation function is applied to provide the output pixel value. The activation function can comprise a simple division, as normally done for convolution, or a more complex function such as sigmoid function, a rectified linear unit (ReLU) activation function or PReLU (Parametric ReLU) function, as typically used in neural networks.

The layers involved in CNN feature classification 14 are typically as follows:

The maps produced by the last convolutional layer are concatenated in a single vector (Vinput);

Vinput is the input to a multi-layer fully connected network comprising a sequence of fully connected network layers, each processing a vector input and providing a vector output;

The output of the fully connected network comprises a vector of classification scores or a feature vector representative of the input image/map(s) in accordance with the CNN training.

The CNN is trained to classify the input ROI into one or more classes or to detect an object with an image. For example, for a ROI potentially containing a face, a CNN might be used to determine if the face belongs to an adult or a child; if the face is smiling, blinking or frowning. For ROI potentially containing a body, the CNN might be used to determine a pose for the body.

Once the structure of the CNN is determined, i.e. the input maps, the number of convolution layers; the number of output maps; the size of the convolution kernels; the degree of subsampling; the number of fully connected layers; and the extent of their vectors—the weights to be used within the convolution layer kernels and the fully connected layers used for feature classification are determined by training against a sample data set containing positive and negative labelled instances of a given class, for example, faces labelled as smiling and regions of interest containing non-smiling faces. Suitable platforms for facilitating the training of a CNN are available from: PyLearn which is based on Theano and MatConvNet which is in turn based on Caffe; Thorch; or TensorFlow. It will nonetheless be appreciated that the structure chosen for training may need to be iteratively adjusted to optimize the classification provided by the CNN.

PCT Application WO 2017/129325 (Ref: FN-481-PCT) and PCT Application No. PCT/EP2018/071046 (Ref: FN-618-PCT), the disclosures of which are herein incorporated by reference, disclose CNN Engines providing a platform for processing layers of a neural network. Image information is acquired across a system bus and the image scanned with pixels of the input image being used to generate output map pixels. The output map pixels are then used by the CNN Engine as inputs for successive layers of the network. In each of these cases, the CNN Engine comprises a limited amount of on-board cache memory enabling input image and output map pixels to be stored locally rather than having to be repeatedly read and written across the system bus.

In order to minimize the amount of on-board memory required by the CNN Engine, processing of an input image can be broken down into tiles, such as disclosed at: https://computer-vision-talks.com/tile-based-image-processing/.

Figure 2:
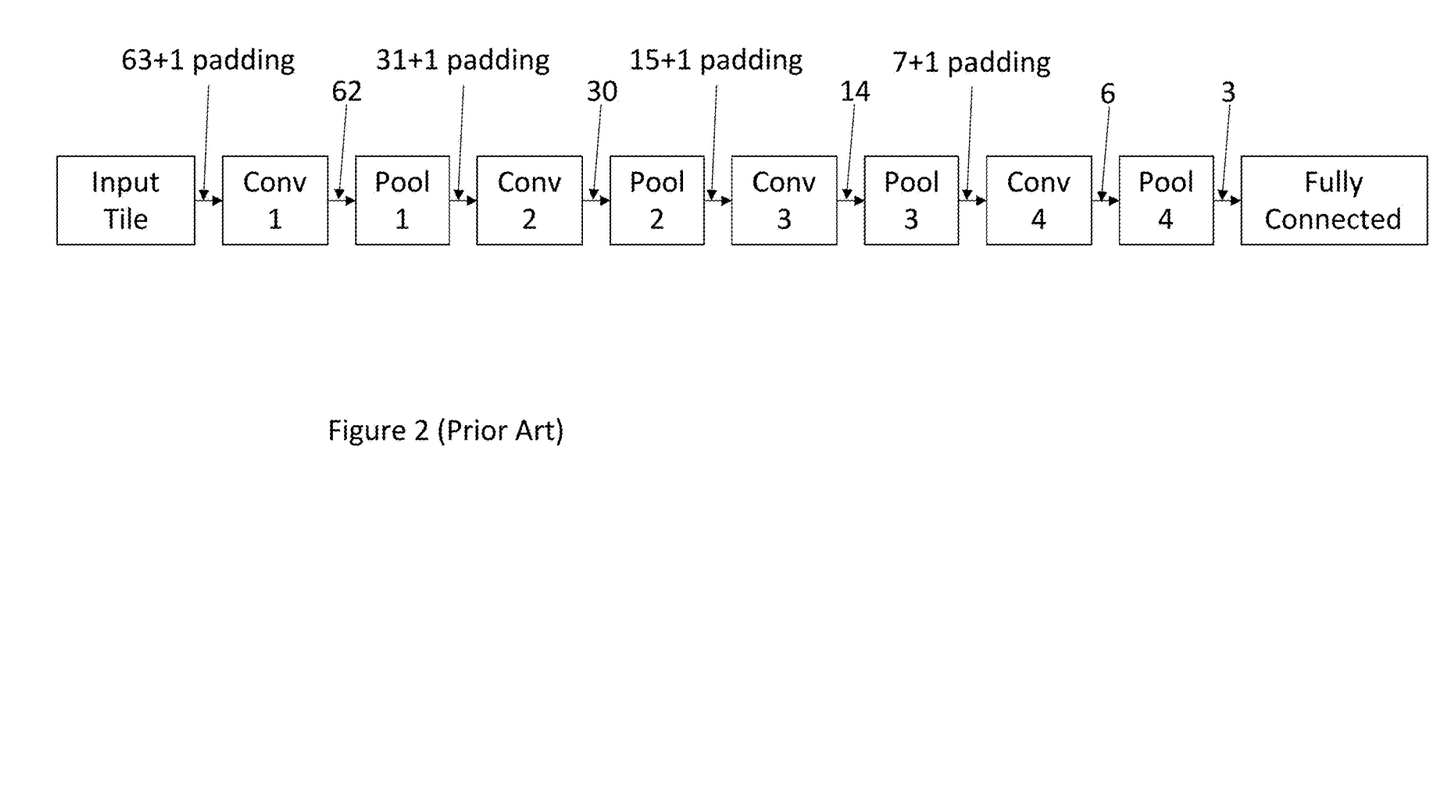
FIG. 2 illustrates the effect of padding and pooling when processing layers in a CNN.

FIG. 2 shows an exemplary portion of a convolutional neural network layer structure which it may be desired to process. As will be seen, an input image tile is fed through 4 successive convolution and pooling layers before the resulting feature vector is fed to a fully connected network. A 64×64 pixel input image tile fed through 4 3×3 convolutional layers, each followed by a 2×2 pooling layer produces 3×3 pixels of information for a feature vector which can then be fed to a fully connected network. (Note that in this case, an edge image tile is chosen and one of the pixels is designated as a padding pixel, so allowing 63 pixels of width wide information to be used to generate 62 pixels of width wide output map information—for image tiles from the centre of an image, 64 pixels of input image information produce 62 pixels of output map information.)

Figure 3:
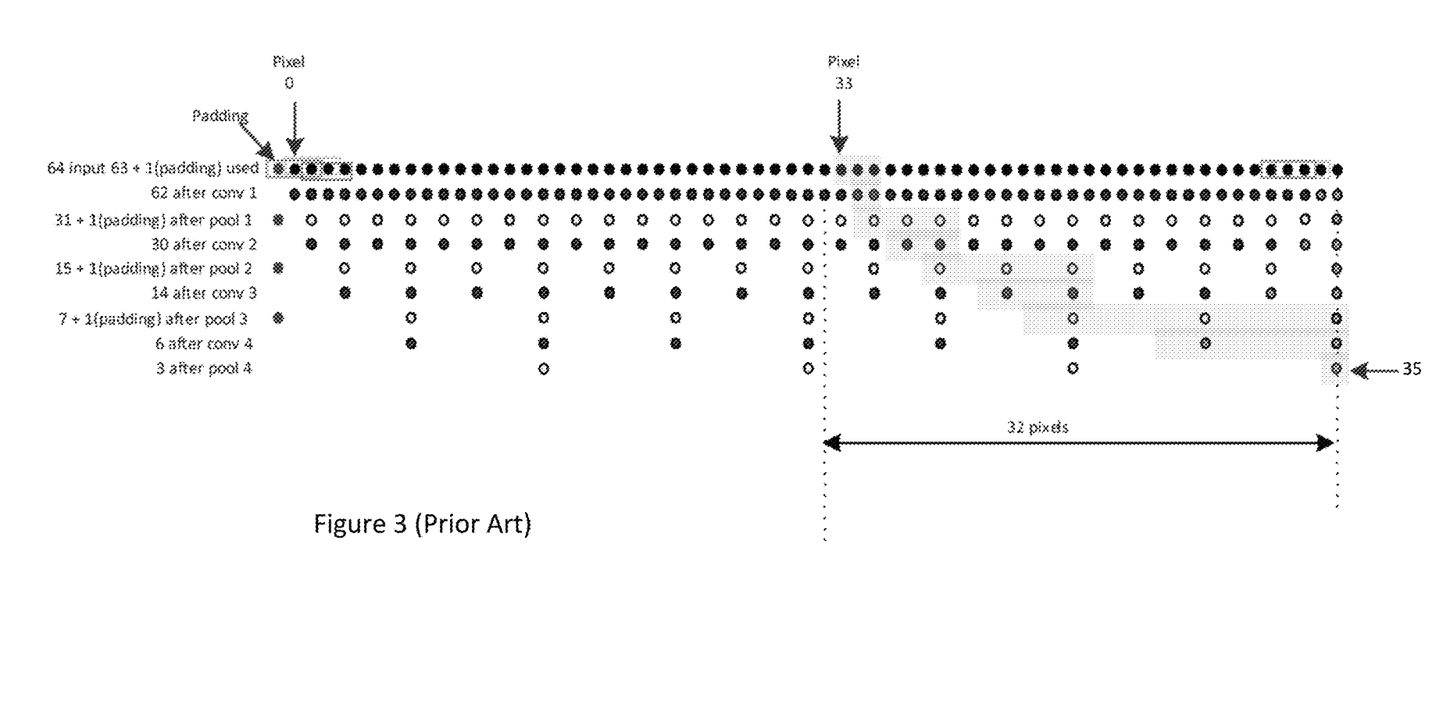
FIG. 3 illustrates the need for overlapping tiles when processing layers of a typical CNN.

FIG. 3 shows the processing of pixels from such a tile graphically. In this case, it can be seen that because of the effect of padding and especially pooling, the value of an output map pixel 35 is affected by input image tile pixels laterally offset from an output pixel location. In this case, input image pixel 33 which is 32 pixels offset from an output map pixel 35 is a factor in calculating the value for output map pixel 35. Note that the same applies in the vertical offset direction.

Figure 4:
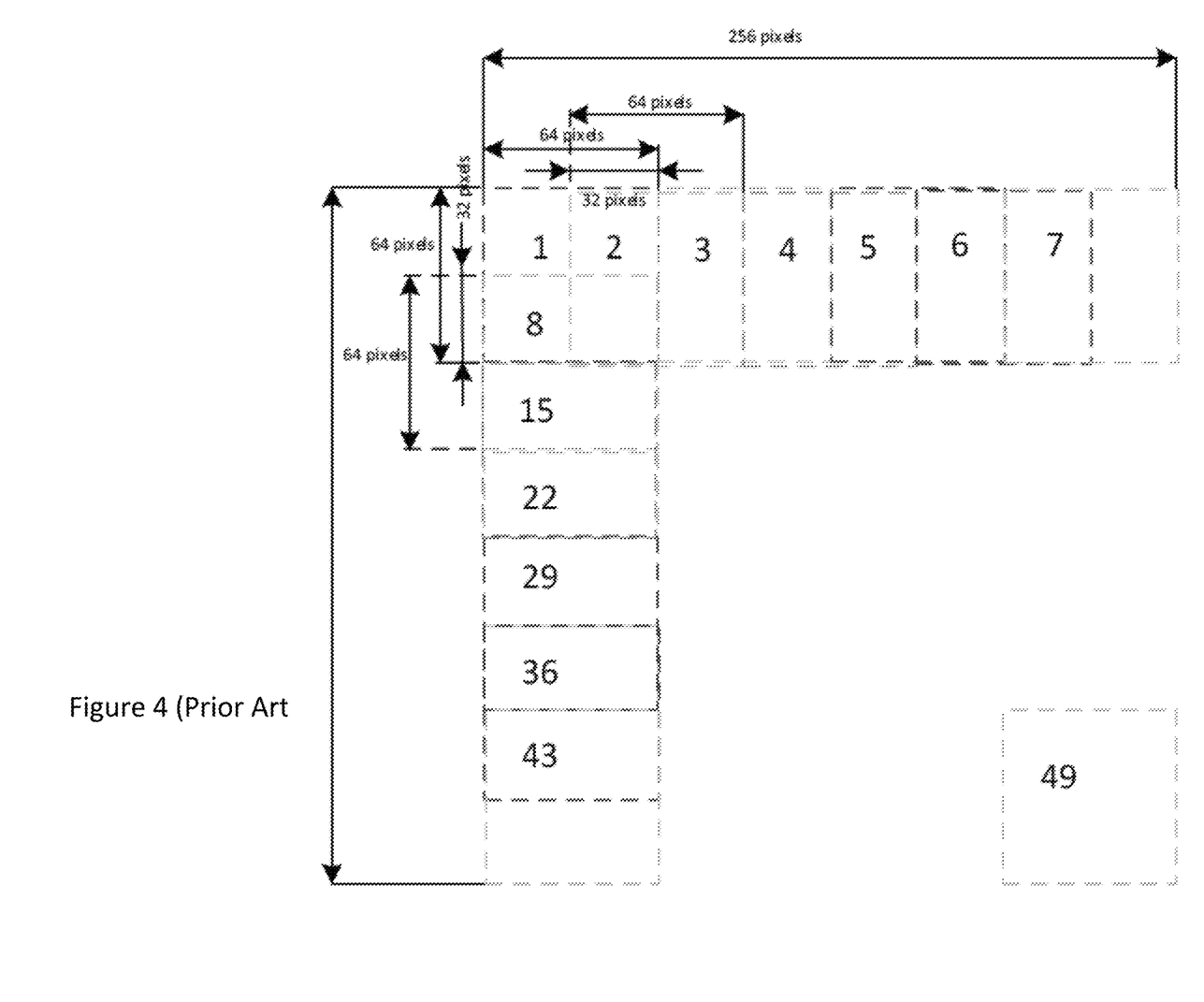
FIG. 4 illustrates a number of overlapping tiles required when processing layers of the CNN of FIG. 3 in a conventional manner.

Referring now to FIG. 4, in order to ensure that input image tile pixel information is available for any given output map pixel location from a given tile, input image tiles are typically provided for processing to a processing engine on an overlapping basis.

Thus, in the present example, for a 256×256 pixel image divided into 64×64 pixel tiles, 49 tiles will need to be provided to a CNN engine with each tile overlapping a previous tile by 32 pixels (50%). Clearly, this involves significant overhead when reading image information from system memory to the CNN engine.

U.S. Pat. No. 7,737,985 discloses graphics circuitry including a cache separate from the device memory, to hold data, including buffered sub-image cell values. The cache is connected to the graphics circuitry so that pixel processing portions of the graphics circuitry access the buffered sub-image cell values in the cache, in lieu of the pixel processing portions directly accessing the sub-image cell values in the device memory. A write operator writes the buffered sub-image cell values to the device memory under direction of a priority scheme. The priority scheme preserves in the cache border cell values bordering one or more primitive objects.

It is an object of the present invention to provide an apparatus for processing a neural network which does not have the same bandwidth requirement when reading image information from system memory.

SUMMARY

According to the present invention, there is provided an apparatus for processing a neural network according to claim 1.

BRIEF DESCRIPTION OF THE DRAWINGS

An embodiment of the invention will now be described, by way of example, with reference to the accompanying drawings, in which.

DESCRIPTION OF THE EMBODIMENT

Figure 5:
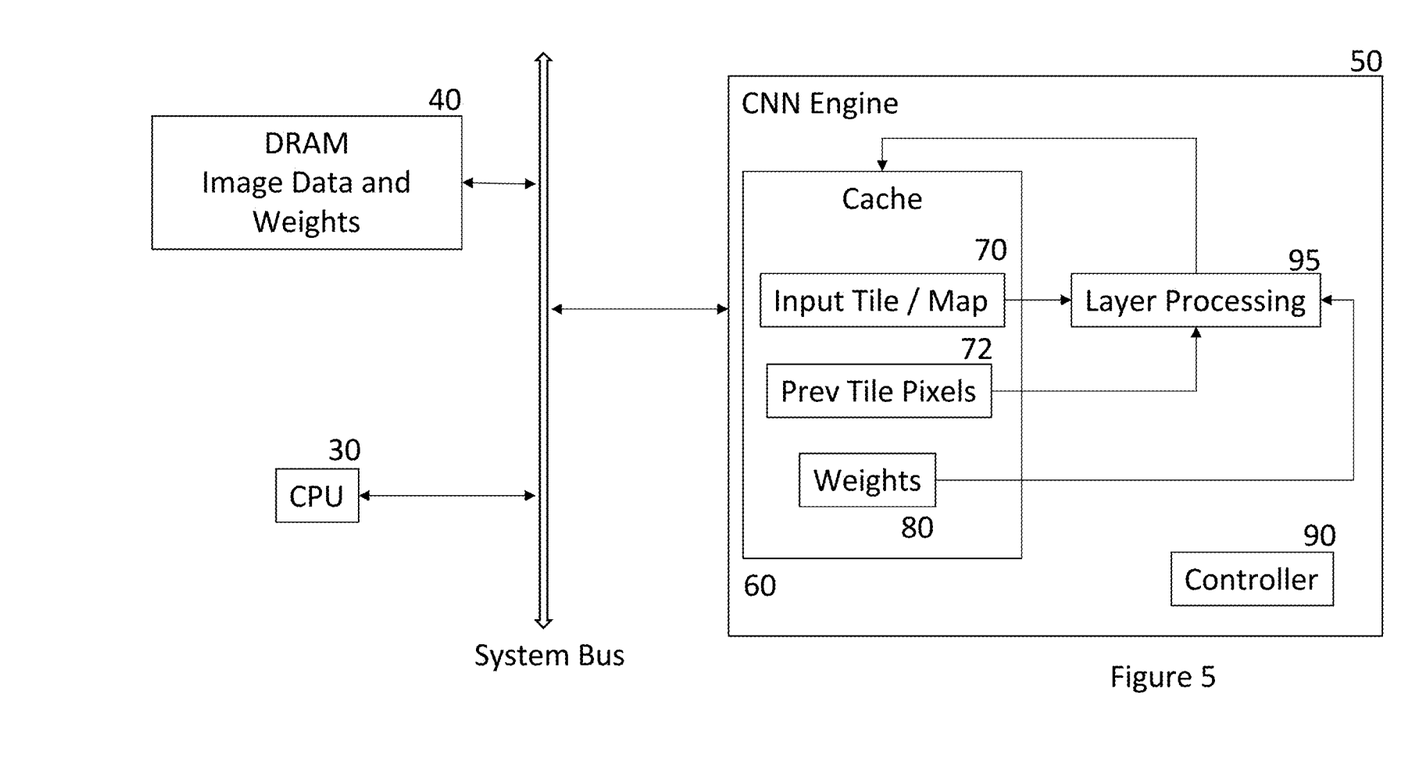
FIG. 5 shows schematically a portion of a system including an apparatus for processing a neural network according to an embodiment of the present invention.

Referring now to FIG. 5, there is shown a system including an apparatus for processing a neural network according to the present invention. In the illustrated embodiment, the apparatus is implemented as a dedicated CNN engine 50 for processing a specific design of neural network, however, it will be appreciated that the CNN Engine 50 can be adapted to bring its advantageous processing to general purpose CNN engines such as those disclosed in PCT Application WO 2017/129325 (Ref: FN-481-PCT) and PCT Application No. PCT/EP2018/071046 (Ref: FN-618-PCT), and indeed any processor or general purpose computer which processes an image, tile-by-tile through a series of neural network layers.

Typically, such systems comprise a central processor (CPU) 30 which communicates with other peripherals within the system, for example, one or more cameras (not shown) to acquire images for processing and to store these in system memory 40 before coordinating with the CNN Engine 50 to process the images.

Within a core of the CNN Engine 50, there is provided a cache 60 in which both input tile and output map information for a given tile is stored in a portion 70 of the cache.

A controller 90, usually triggered by the CPU 30, enables the CNN Engine 50 to read an image, tile-by-tile from system memory 40 and to write this into the cache 60.

Weight information can also be stored in a cache and as disclosed in PCT Application WO 2017/129325 (Ref: FN-481-PCT) and PCT Application No. PCT/EP2018/071046 (Ref: FN-618-PCT), this can be in a separate memory from that storing the input tile and output map information or it can be stored in a different portion 80 of the memory 60 from the input tile and output map information 70.

In one implementation, the controller 90 enables the CNN Engine 50 to acquire the required weights information from system memory 40 for processing the required layers of a network. In other embodiments, the weights information can be pre-stored within the CNN Engine 50 so avoiding the need to read this across the system bus.

The controller 90 is also able to obtain network configuration information so that it knows the parameters and weights for each layer of the neural network to be processed. Again, this can be pre-stored within the CNN Engine 50 or the CPU 30 can provide the configuration information to the CNN Engine 50 at run-time.

For any given layer of a CNN to be processed, once the input image tile or input map (an output map generated from a previous layer of the network) and the required weights are available, these are fed to a layer processing engine 95 where the input information is combined with the weight information to generate output map information which is written back into memory 70 within the cache 60.

Unlike in conventional processing however, the layer processing engine 95 not only uses input image tile information from a given tile stored in memory 70, but the layer processing engine 95 uses certain limited information stored from the processing of previous input image tiles in order to reduce the overlap required between input image tiles read from system memory 40.

Figure 7:
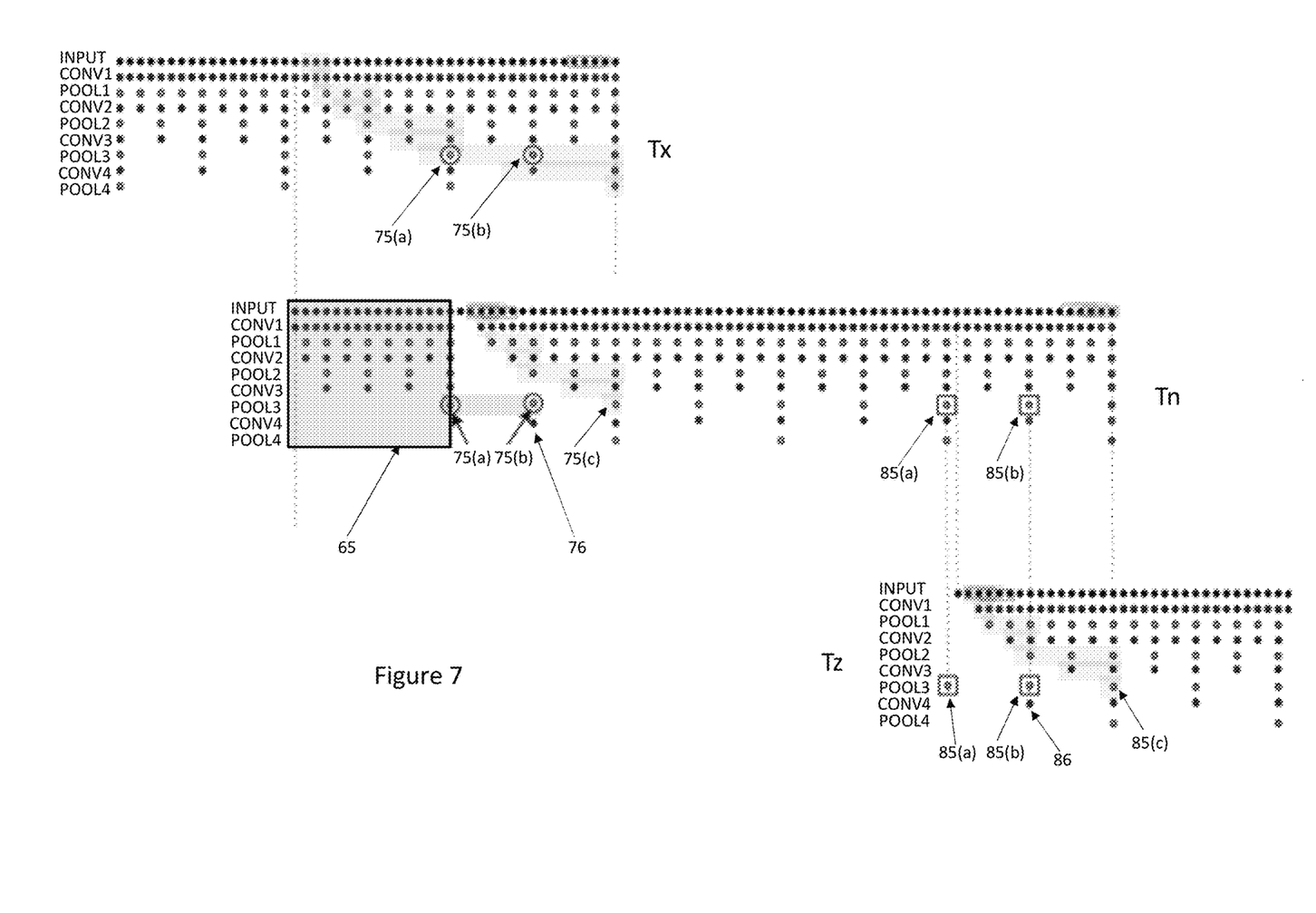
FIG. 7 illustrates how the pixels of FIG. 6 are employed.

Referring to FIG. 7, it will be seen that when processing a tile Tx, output map values 75(a) and 75(b) are generated after pooling layer 3. These same values can also be employed by at least one subsequent tile Tn which overlaps in area (to a lesser extent than using conventional techniques) with tile Tx. Although illustrated for horizontal overlap between tiles Tx, Tn and Tz, it should be appreciated how this also applies to vertically overlapping tiles.

While this is also true of some output map values from previous layers of the network, it will be seen that the number of input pixels 65 affecting the values 75(a), 75(b)

is relatively larger and more offset than the input pixels affecting output map values for earlier layers of the network including after pooling layers 1 and 2.

Embodiments of the present invention leverage this fact by storing a limited number of output map pixels for a layer after at least one pooling step in a convolutional neural network in memory for use in processing subsequent tiles. Preferably, certain output map pixels for a layer after two pooling steps of the convolutional neural network are stored and most preferably certain output map pixels for a layer after three pooling steps of the convolutional neural network are stored.

Note however, that the pixels from one tile which are to be stored for processing of a subsequent tile are not drawn from the output map after the last pooling layer, in this case pooling layer 4, as these pixels do not lie in the overlap region between tiles—or if they did, the overlap between tiles would be so great or the tiles so large that the benefits of the present approach would be mitigated.

In the embodiment, it is assumed that tiles are acquired from a top corner of an image left-to-right, row-by-row, but it will be appreciated that tiles can be read in reverse or flipped order and the embodiment adjusted accordingly.

Figure 6:
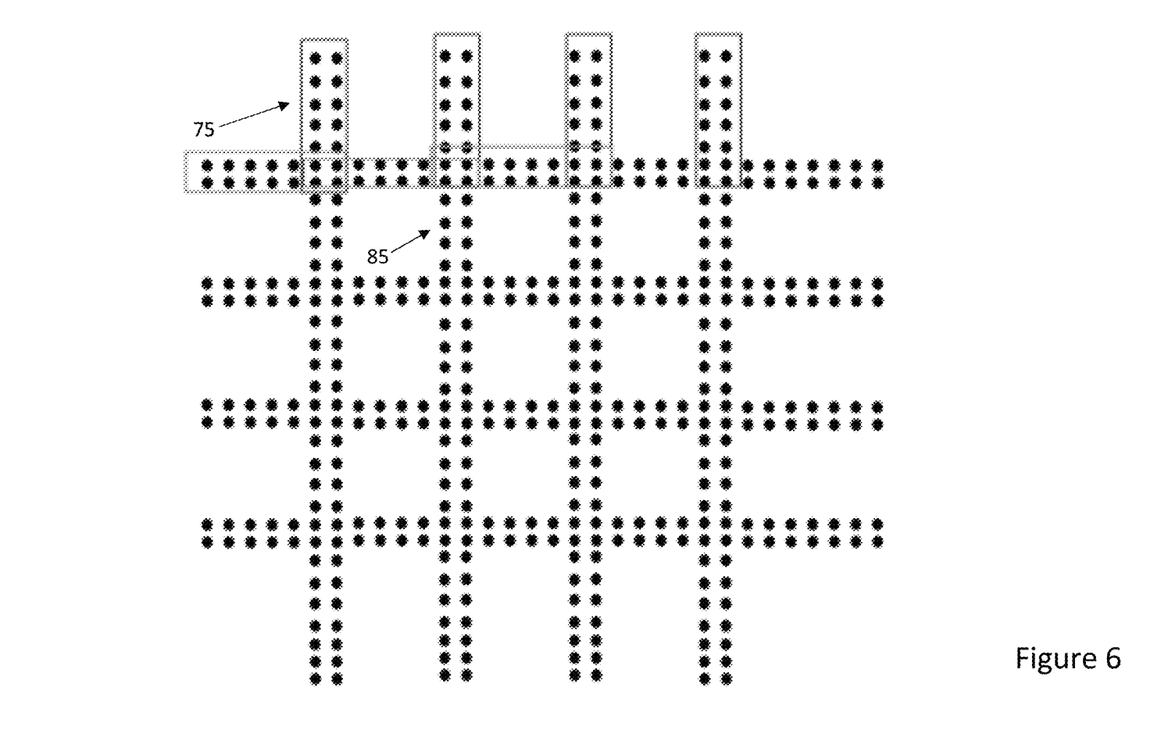
FIG. 6 illustrates a pattern of pixels from an output map which are cached within the apparatus of FIG. 5 and used in the processing of subsequent tiles.

As shown in FIG. 6, in the embodiment, two columns of such output map values from the selected layer, in this case after pooling layer 3, adjacent the right boundary of a tile are stored, although it will be appreciated that in variations of the embodiment only one column or more than two columns of output map values can be stored.

While FIG. 7 illustrates the principal for columns, it will be appreciated, as illustrated in FIG. 6, that the principal can be extended to rows running adjacent the lower boundary of tiles.

In the embodiment, these values are stored in a portion 72 of cache memory 60, although it will be appreciated that values can also be stored in a separate dedicated memory from memory 60.

In any case, referring back to FIG. 7, this means that when the layer processing engine 95 is operating towards the left boundary of a subsequent tile, it need not perform all of the calculations to determine the output map values in this case up to and including pooling layer 3 within two values of the left tile boundary.

This means that when determining an output map value 76 after convolution layer 4 for tile Tn, the layer processing engine 95 will use a combination of pre-stored values 75(*a*), 75(*b*) generated during the processing of previous tile Tx as well as a value 75(*c*) obtained from the output map after pooling layer 3 when processing current tile Tn.

The value 75(*a*) essentially acts as a proxy for the map information contained in the pixels 65 and so allows the overlap between image tiles to be reduced from the 32 pixels shown in FIGS. 3 and 4 to 16 pixels.

Correspondingly, during later processing of pooling layer 3, output map pixels 85(*a*) and 85(*b*) from adjacent the right boundary of the tile are not alone written back to memory 70, but they are also stored in memory 72. Thus, when processing subsequent tile Tz, output map values 85(*a*) and 85(*b*) can be retrieved from memory 72 and used in conjunction with output map value 85(*c*) only calculated during the processing of tile Tz to generate output map value 86.

Turning again to FIG. 6, it will be seen that after pooling layer 3 where as shown in FIG. 2, each tile produces a 7×7 output map, during processing of a first tile, the rightmost and bottom two columns and rows of the output map are generated and stored both in memory 70 and 72. Then, during processing of subsequent tiles, the leftmost and top two columns and row values are retrieved from memory 72 and combined with values calculated during the processing of a given tile to produce output map values for a subsequent layer of the given tile.

Note that once the processing of convolution layers is complete, the CNN Engine 50 can continue by generating a feature vector comprising a combination of the output maps generated from the processing of the image tiles in an otherwise conventional fashion to produce the required classification of an image and this is not described in further detail here.

Figure 8:
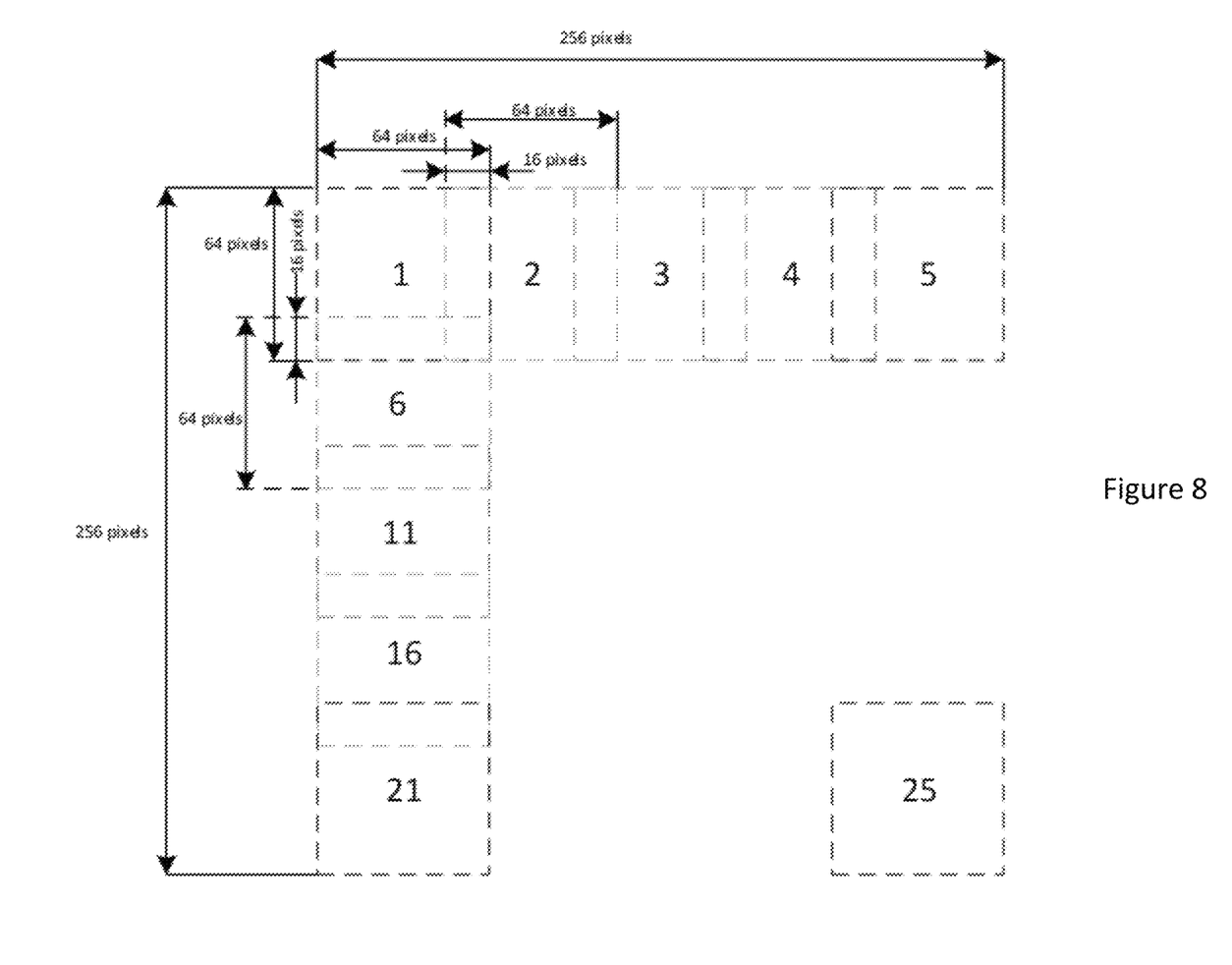
FIG. 8 illustrates a reduction in required bandwidth when employing the apparatus of FIG. 5.

The present approach enables the overlap between tiles vis-à-vis the example shown in FIGS. 3 and 4 to be halved from 32 to 16 pixels and as shown in FIG. 8, it allows a 256×256 image to be processed using 5×5=25 64×64 tiles rather than 49 such tiles representing a 49% bandwidth improvement as well as a slightly lower power requirement because of the reduction in duplicate processing around the boundaries of certain layers of the network. It will be appreciated that this improvement in bandwidth is achieved by storing only a minimal number of 228 additional values, as shown in FIG. 6, within the CNN Engine 50 and with little additional control logic.

It will be appreciated that when using 64×64 pixel tiles, where the CNN Engine 50 is dedicated for processing a given neural network schema, the switching involved in selecting and storing boundary pixels from/in memory 72 can be hardwired using simple shifting and multiplexing circuitry and can be done with no processing delays.

On the other hand, the CNN Engine 50 could be implemented as an extension of the CNN engines disclosed in PCT Application WO 2017/129325 (Ref: FN-481-PCT) and PCT Application No. PCT/EP2018/071046 (Ref: FN-618-PCT) where the controller 90 is configurable to select for which layer, or possibly layers, boundary pixels are to be stored in a separate memory for use in processing subsequent tiles.

The invention claimed is:

1. An apparatus comprising:
   an image memory configured to receive an input image tile-by-tile, a first tile at least partially overlapping a second tile;
   a weights memory configured to store weight information associated with a plurality of convolutional layers of a neural network, said neural network including a first pooling layer, a second pooling layer, and a third pooling layer; and
   a layer processing engine configured to:
      combine, as first combined information, information associated with said image memory and said weight information associated with said weights memory;
      generate a first output map for said first tile based at least in part on the first combined information;
      write said first output map to said image memory;
      generate map values adjacent a boundary of said first output map, said map values generated after said first pooling layer and before said third pooling layer of said neural network;
      store, as stored map values in said image memory, said map values adjacent said boundary of said first output map;
      combine, as second combined information, said stored map values adjacent the boundary of said first output map with input map information from said image memory and said weight information from said weights memory; and generate a second output map associated with said second tile based at least in part on said second combined information.

2. An apparatus according to claim 1 wherein:
said neural network comprises a first convolutional layer followed by the first pooling layer, a second convolutional layer followed by the second pooling layer, a third convolutional layer followed by the third pooling layer, and a fourth convolutional layer followed by a fourth pooling layer, and
said map values adjacent the boundary of said first output map are generated after the second pooling layer and before the fourth pooling layer.

3. An apparatus according to claim 1 wherein said map values comprise one or more of: two columns of output values; and two rows of output values from adjacent said boundary of said first output map.

4. An apparatus according to claim 1 wherein:
said input image is read from a top corner, left-to-right, row-by-row, and
said map values adjacent said boundary comprises one or more of: a right boundary, a left boundary, a top boundary, and a bottom boundary of said first output map, and said layer processing engine is further configured to:
access said stored map values associated with said first tile from said image memory to generate said second output map.

5. An apparatus according to claim 1 wherein image said second tile overlaps said first tile by less than 25%.

6. An apparatus according to claim 1 wherein said input image comprises 256×256 pixels and wherein said input image is written to said image memory in 25 64×64 pixel tiles.

7. A system comprising:
one or more processors; and
non-transitory computer-readable storage media storing instructions that, when executed by the one or more processors, cause the system to perform operations comprising:
receiving, from a first memory, an input image tile-by-tile, a first tile at least partially overlapping a second tile;
receiving, from a second memory different from the first memory, weight information associated with a plurality of convolutional layers of a neural network, said neural network including a first pooling layer, a second pooling layer, and a third pooling layer;
combining, as first combined information, information associated with said first memory and said weight information associated with said second memory;
generating a first output map for said first tile based at least in part on the first combined information;
writing said first output map to said first memory;
generating map values adjacent a boundary of said first output map, said map values generated after said first pooling layer and before said third pooling layer of said neural network;
storing, as stored map values, said map values adjacent said boundary of said first output map;
combining, as second combined information, said stored map values adjacent the boundary of said first output map with input map information from said first memory and said weight information from said second memory; and
generating a second output map associated with said second tile based at least in part on said second combined information.

8. The system of claim 7, wherein:
said neural network comprises a first convolutional layer followed by the first pooling layer, a second convolutional layer followed by the second pooling layer, a third convolutional layer followed by the third pooling layer, and a fourth convolutional layer followed by a fourth pooling layer, and
said map values adjacent the boundary of said first output map are generated after the second pooling layer and before the fourth pooling layer.

9. The system of claim 7, wherein said map values comprise one or more of: two columns of output values and two rows of output values from adjacent said boundary of said first output map.

10. The system of claim 7, wherein:
said input image is read from a top corner, left-to-right, row-by-row, and
said stored map values comprise one or more of: a right boundary, a bottom boundary a left boundary, and a top boundary.

11. The system of claim 7, wherein image said second tile overlaps said first tile by less than 25%.

12. The system of claim 7, wherein said input image comprises 256×256 pixels and wherein said input image is written to an image memory in 25 64×64 pixel tiles.

13. The system of claim 7, wherein the first tile at least partially overlapping the second tile comprises a horizontal overlap or a vertical overlap.

14. The system of claim 7, wherein a first number of pixels associated with the first pooling layer is greater than a second number of pixels associated with the second pooling layer.

15. A method comprising:
receiving, from a first memory, an input image tile-by-tile, a first tile at least partially overlapping a second tile;
receiving, from a second memory different from the first memory, weight information associated with a plurality of convolutional layers of a neural network, said neural network including a first pooling layer, a second pooling layer, and a third pooling layer;
combining, as first combined information, information associated with said first memory and said weight information associated with said second memory;
generating a first output map for said first tile based at least in part on the first combined information;
writing said first output map to said first memory;
generating map values adjacent a boundary of said first output map, said map values generated after said first pooling layer and before said third pooling layer of said neural network;
storing, as stored map values, said map values adjacent said boundary of said first output map;
combining, as second combined information, said stored map values adjacent the boundary of said first output map with input map information from said first memory and said weight information from said second memory; and
generating a second output map associated with said second tile based at least in part on said second combined information.

16. The method of claim 15, wherein:
said neural network comprises a first convolutional layer followed by the first pooling layer, a second convolutional layer followed by the second pooling layer, a third convolutional layer followed by the third pooling layer, and a fourth convolutional layer followed by a fourth pooling layer, and said map values adjacent the boundary of said first output map are generated after the second pooling layer and before the fourth pooling layer.

17. The method of claim 15, wherein said map values comprise one or more of: two columns of output values; and two rows of output values from adjacent said boundary of said first output map.

18. The method of claim 15, wherein said stored map values comprise one or more of: a right boundary, a bottom boundary, a left boundary, and a top boundary.

19. The method of claim 15, wherein image said second tile overlaps said first tile by less than 25%.

20. The method of claim 15, wherein said input image comprises 256×256 pixels and wherein said input image is written to an image memory in 25 64×64 pixel tiles.

\* \* \* \* \*